United States Patent [19]
Gliemeroth et al.

[11] 4,199,335
[45] Apr. 22, 1980

[54] PROCESS FOR THE PRODUCTION OF OPTICAL FIBERS FOR TRANSMISSION OF COMMUNICATION

[75] Inventors: Georg Gliemeroth, Mainz-Finthen; Lothar Meckel, Oestrich-Winkel, both of Fed. Rep. of Germany

[73] Assignee: Jenaer Glaswerk Schott & Gen., Mainz, Fed. Rep. of Germany

[21] Appl. No.: 941,692

[22] Filed: Sep. 12, 1978

[30] Foreign Application Priority Data

Apr. 4, 1978 [DE] Fed. Rep. of Germany ....... 2814380

[51] Int. Cl.² ............................................. C03B 37/02
[52] U.S. Cl. .......................................... 65/2; 65/3 A; 65/13; 427/163; 427/167
[58] Field of Search ................ 65/2, 3 A, 13, DIG. 7; 427/163, 167

[56] References Cited

U.S. PATENT DOCUMENTS 4,045,198  8/1977  Rau et al. ..................... 65/3 A X

FOREIGN PATENT DOCUMENTS 2741854  3/1978  Fed. Rep. of Germany ............ 65/3 A Primary Examiner—Robert L. Lindsay, Jr.
Attorney, Agent, or Firm—Millen & White

[57] ABSTRACT

In a process for the production of communication fibers having transmission losses of less than 10 db/km. and a pulse dispersion of less than 4 ns/km., both measured at 860 nm, by the internal cladding method, wherein multiple-component glasses are deposited in layers in the glassy state in the interior of a glass tube; the tube thus clad inside, is collapsed to a rod; and the rod is drawn into a fiber, the core diameter of which has an eccentricity of less than 2%, an improvement is provided wherein a precollapsing step is executed prior to the final collapsing process, the precollapsing step occurring during the internal cladding step. The temperature of the cladding step is greater than 1850° C. and above the softening point of the glass tube.

15 Claims, 10 Drawing Figures

PROCESS FOR THE PRODUCTION OF OPTICAL FIBERS FOR TRANSMISSION OF COMMUNICATION

BACKGROUND OF THE INVENTION

The present invention concerns a novel process for the production of communication-transmitting optical fibers.

Qualified communication fibers must be distinguished by low transmission losses of less than 10 db/km., preferably less than 6 db/km., and by a low pulse dispersion of less than 4 ns/km., preferably less than 2 ns/km., if they are to be suitable for the transmission of information over more than 1,000 m. with an adequate bandwidth of several hundred megahertz. Such values are only achieved by fibers, the refractive index profiles and geometries of which have been accurately predetermined, and heretofore could be attained only to an inadequate extent.

As is known, two CVD (Chemical Vapor Deposition) methods are employed for the production of preforms for communication fibers.

One method, the external cladding technique, is based on the deposition of glass soot by means of a pyrolysis burner on a quartz glass rod. (See, e.g., U.S. Pat Nos. 3,711,262 or 3,823,995). After the cladding step, the rod can be pulled out and the hollow cylinder is sintered to produce the preform and then drawn into a fiber.

In the other method, the internal cladding technique, a quartz tube is heated to such an extent that metal halides, e.g., of Si, Ge, P, B, Sb, etc. and oxygen, with which compounds the carrier gas stream flowing therethrough is laden, are decomposed by pyrolysis and are deposited on the inner wall of the tube; the carrier gas stream can likewise be $O_2$ in the process. (For example, see DAS No. 2,546,162; British Patent Application No. 42779/76; and U.S. Pat. application Ser. No. 732,197, and U.S. Pat. application Ser. No. 941,691, filed on Sept. 12, 1978, whose disclosures are incorporated by reference herein).

Cladding takes place generally in two phases. First of all, optical insulating layers are applied, primarily $B_2O_3$-$SiO_2$ systems (e.g., British Pat. No. 1,426,605; J. Am. Ceramic Soc. 58 (5-6), 261, (1975) and U.S. Pat. No. 3,963,468, as well as copending U.S. application Ser. No. 941,691 filed on Sept. 12, 1978.

Thereafter, the core layers are produced wherein the index of refraction rises from the first core layer to the last core layer, generally parabolically (see above cited references). In this process, the next following step is particularly critical, wherein a solid rod (the preform) is produced from the thus-coated tube by collapsing. At this point, irregularities and flaws are produced time and again in the originally circular cross section of the tube. This deviation from the circular shape is also entrained into the fiber, leading to an impairment in geometry and thus to poorer physical characteristics, especially the pulse dispersion.

Solutions for this problem have been suggested, DOS [German Unexamined Laid-Open Application] No. 2,711,295 describes a process wherein the collapsing step is executed under positive counterpressure. However, this process cannot be integrated into the cladding procedure, but rather demands an interruption of the process and is complicated. As a consequence, damaging effects (water, dirt particles) can negatively affect the properties of the layers and of the subsequently produced preform.

SUMMARY OF THE INVENTION

Accordingly, it is an object of this invention to provide a process for the production of communication fibers which makes it possible to obtain maximally high communication fiber properties, special emphasis being placed on the geometry of the fiber with respect to the dimensions of the core and of the outer shell.

Upon further study of the specification and appended claims, further objects and advantages of this invention will become apparent to those skilled in the art.

These objects have been attained by providing a process which makes it possible to obtain preforms with exactly circular cross sections without having to separate the cladding step from the collapsing step. This process comprises precollapsing the tubular substrate during the cladding of the tube prior to the final collapsing step. The novel process utilizes, preferably and in contradistinction to the conventional internal cladding methods, tube temperatures of above 1850° C. Thus, it is termed the Schott High Temperature CVD Process.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

As a result of the process of this invention, the following advantages can be derived.

Firstly, the cross section of the tube becomes somewhat smaller from the deposition of one layer to the deposition of the next and, concomitantly therewith, the wall thickness of the tube increases, leading to a stability of the circular cross section of the tube. After the entire cladding step, the tube's cross section has been narrowed to such an extent that only a few collapsing steps are sufficient for collapsing the tube into a rod. Thereby, losses of doping material from the core substance, in particular uncontrolled differences from one layer to the next, are kept at a minimum, and more uniform refractive index profiles are obtained, whereby the good transmission properties are achieved.

Furthermore, tubes having a rather large diameter can be utilized, i.e., larger precipitation areas can be employed at higher throughflow rates of the reactive gaseous mixture of metal halides and oxygen, without a substantial increase in the number of collapsing steps required.

At the above-mentioned high temperatures, the last, high-refractive index and higher-viscosity layers are still sufficiently fluid to avoid a mutual interference between the outer, low-viscosity layer structures and the inner, high-viscosity layer structures. Apparently, the change in surface tension independently of the temperature is of special significance in connection with this effect. This is shown in the Drawings.

Figure 1:
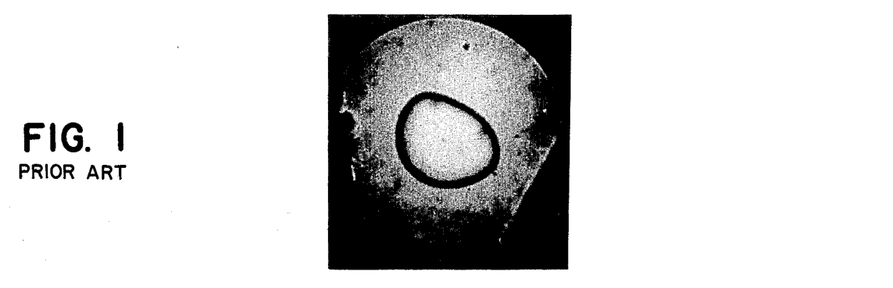
FIG. 1-3 show photomicrographs of cross sections of prior art optical fibers.
Figure 2:
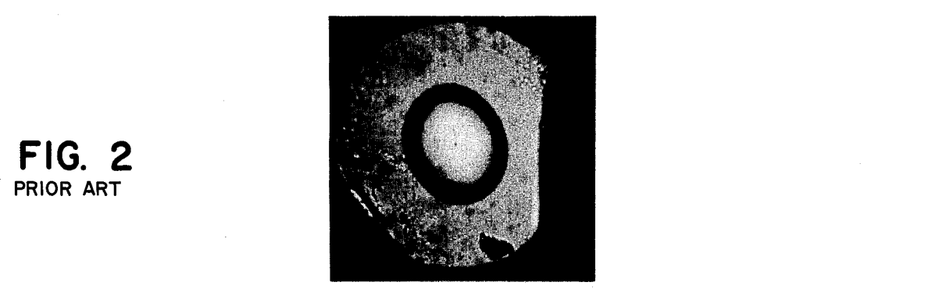
Figure 3:
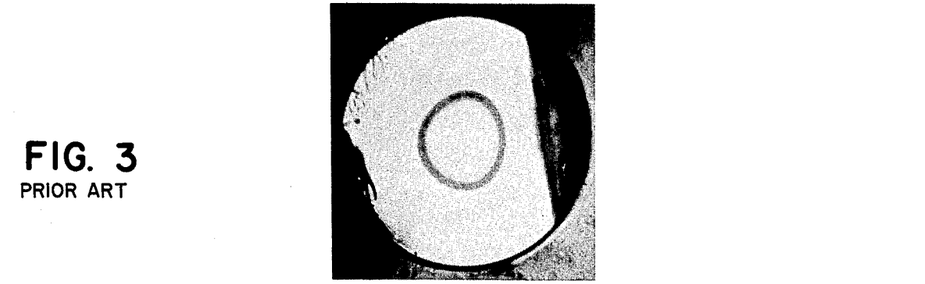
Figure 4:
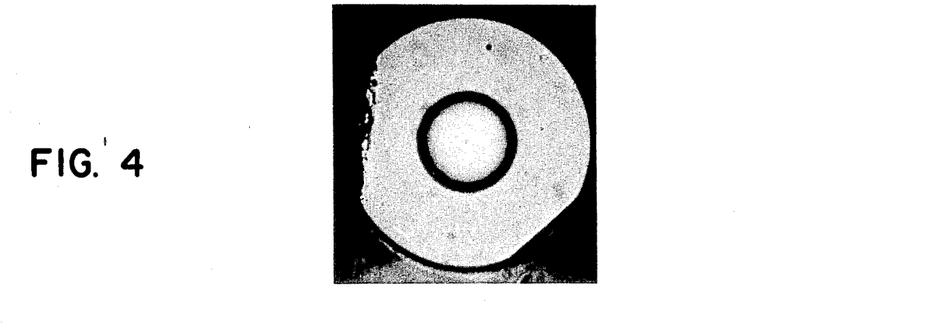
FIG. 4 shows a photomicrograph of the cross section of a fiber of this invention.

FIGS. 1-3 show photomicrographs of cross sections through conventionally flawed fibers characterizing the nature of the difficulties encountered in the conventional processes; and FIG. 4 shows a photomicrograph of a cross section through a fiber made in accordance with the method of this invention, produced by cladding at 1900° C. Generally, fibers of this invention have core diameters with an eccentricity of less than 2%, e.g., 0-1.9%.

The novel process moreover exhibits the essential advantage of depositing the halides in an almost optimal fashion, especially by melting them to the glassy state. At the high temperatures employed, as compared to the medium and lower pyrolysis temperatures generally employed in prior art processes, e.g., 700-1600° C., the thickest pyrolysis layers are generated. Due to this substantially improved degree of effectiveness of the pyrolysis, the yield in length from such a preform can be considerably, enhanced, i.e., tubes much longer than those conventionally operable, can be employed.

Furthermore, the ends of the preform can be used even more successfully than heretofore possible for fiber production. In addition, the high-temperature method leads to a substantially lower output of undecomposed halides.

The conventional processes generally employ techniques which are illogical from the following point of view. The conventional claddings (by pyrolysis) are executed at lower temperatures and the subsequent collapsing step is executed at a higher temperature. In this connection, only those processes are referred to wherein the deposition is made directly in the glassy state. The solubility in the deposited layers of the gases which are created by the carrier gas, and as a consequence by the pyrolysis process is in most cases higher at low temperatures than at higher temperatures.

For this reason, it is substantially more advantageous to effect the cladding and collapsing steps at an approximately identical temperature, instead of conducting the internal cladding at a lower temperature and then the collapsing step at a higher temperature. Only when proceeding in this fashion, are layers produced within temperature ranges which, during collapsing, do not experience any "reboil". Thus, the susceptibility to trouble during the production of preforms is considerably lessened, the yield is increased, and the productivity of the process is decisively enhanced.

Figure 5:
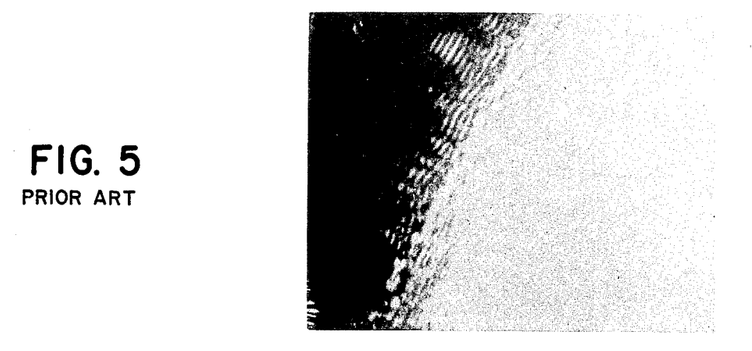
FIG. 5 and 6 show photomicrographs of a longitudinal section of a prior art optical fiber preform.

The greatest advantage of the novel process is the continual complete refining of all precipitated layers during the entire cladding process. In the processes known heretofore, secondary refining (reboiling) was all to frequently encountered during the collapsing step due to the higher temperatures used. This step constitutes the first temperature increase during the preform production in these processes. The effects of this reboiling can be seen especially clearly from FIGS. 5 and 6. FIG. 5 shows a photomicrograph of a longitudinal section of a flawed preform made from a conventionally clad tube (soot precipitation). Due to the low temperatures employed during the deposition of the layers, the latter could not be entirely refined, and the collapsing process liberated refining gases (chloride and oxygen) which migrated through the layers and intermingeld them by turbulence. The thus-produced fiber, though showing low losses of 4 db/km., exhibited a pulse width dispersion of 37 ns/km.

Figure 6:
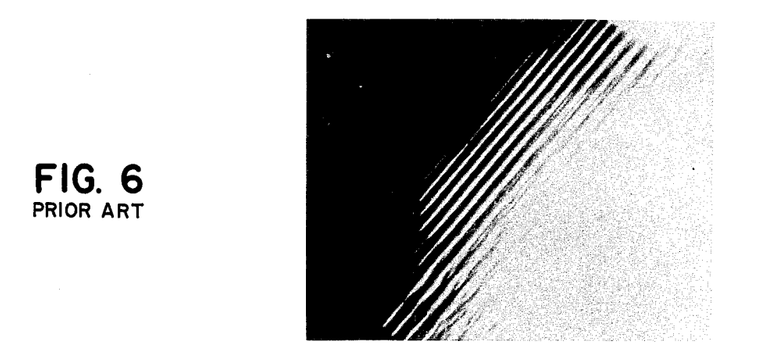

FIG. 6 shows a photomicrograph of a preform produced from a clad tube, the last core layers of which were applied at low temperatures while the layers lying therebelow were applied at higher temperatures. Here again, the collapsing step caused reboiling in the last layers. As for FIG. 5, the refractive index profile is disturbed by the turbulent intermixing of the layers. Thereby, the pulse dispersion is decisively impaired.

Figure 7:
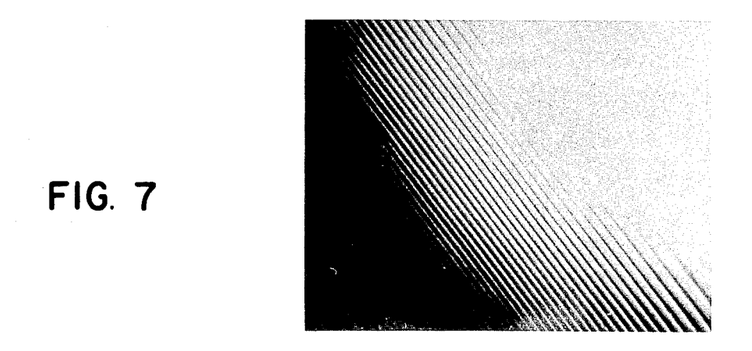
FIG. 7 shows a photomicrograph of a longitudinal section of an optical fiber preform of this invention.

FIG. 7 shows a photomicrograph of a longitudinal section through a preform prepared according to the process of the invention, wherein there is no danger of reboiling on account of the high precipitation and/or pyrolysis temperature employed during deposition of the individual layers. The thus-produced fiber had, in addition to low losses of 3 db/km., also a very minor pulse width dispersion of 1.1 ns/km.

To keep the reboiling effects at a minimum, the cladding should be carried out at temperatures which are not greater than 160° C. below the collapsing temperature. In this way, it is additionally possible to effect complete collapsing using at most 1-4 collapsing steps. This reduces the refractive index depression (dip) in the center of the fiber core.

While a temperature of 160° C. below the collapsing temperature (assuming only four collapsing steps with an original outer diameter of the tube of 20.0 mm. and a wall thickness of 1.4 mm. or a minimum temperature of 1850° C. as in Example 1 below) just barely misses the danger of reboil of the multicomponent glass layers, this danger of reboil is generally eliminated at temperatures of on the average 150° C. to 0° C. less than the minimum collapsing temperature. Also, at temperatures above 1850° C., the surface tension no longer undergoes changes of such an extent that uncontrolled deformations interfere with the geometry.

The basic aspect of the present invention is based on the realization that is possible to avoid deformations of the tube if certain dimensional conditions are maintained, and that this possibility exists in spite of the use of high temperatures of above 1850° C. and the concomitant local softening of the silicate glass tube. Assuming an inner tube radius of $R_i$ prior to cladding, this inner radius will change under the process conditions of this invention to an inner tube radius of $r_i$ after the cladding step and prior to the actual collapsing procedure. In this connection, the thickness of the layers S deposited on the inner wall of the tube is ignored. Condition A (FIG. 8) exists prior to cladding and condition B exists after cladding, but prior to the conventional collapsing step.

Preferably, tubes are used as the starting material which have a ratio of $R_o/R_i > 1.15$, e.g., 1.15–1.3, most preferably 1.16–1.24, and preferably have a precollapsing ratio of $R_i/r_i > 1.7$, e.g., 1.7–2.5, most preferably 1.65–2.0.

As mentioned above, the most essential feature of the present invention resides in the fact that during the course of the inner cladding of the tube, the tube is simultaneously precollapsed. A ratio of $R_i:r_i$ at least of 1.7 should be exceeded to ensure good preform qualities. The significance of the characteristic numbers $R_o/R_i$ and $R_i/r_i$ can be most clearly seen from examples 1–9 of Table 2.

In general, the foregoing ratios will most readily be met if the following experimental parameters and procedures are utilized.

Any parameters not fully discussed herein are to be used in accordance with conventional CVD techniques as fully described in publications such as David Pearson, "Glass Fiber Waveguides for Optical Communication Applications", Appl. Solid State Sciences, 1976, 6, 173–242, whose disclosure is incorporated by reference herein.

In the CVD method, the desired metal oxide glass layers are deposited on the silica substrate by decomposition of a gaseous starting material such as a halide of the metal cation. One apparatus which can be used is schematically illustrated in FIG. 9.

Figure 9:
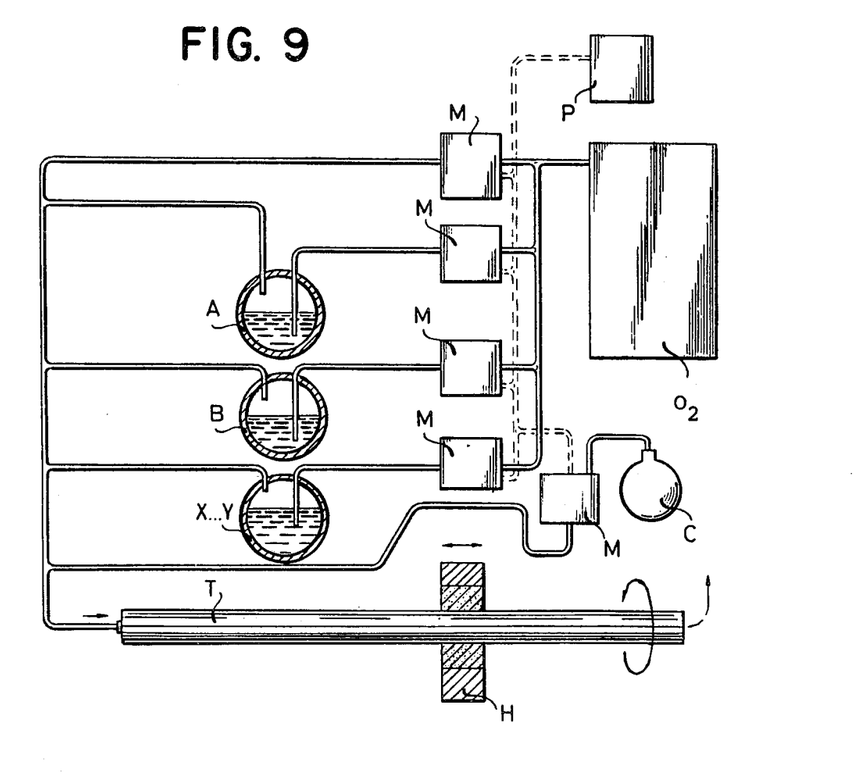
FIG. 9 illustrates an apparatus which can be used in carrying out the process of this invention.

FIG. 9 shows a gas bottle containing a carrier gas, $O_2$, from which a stream of $O_2$ flows through a flow volume regulator M. The correctly measured dose of oxygen is then conducted, either directly or through charging or doping vessels, into a glass tube T. The charging or doping vessels A, B, X . . . Y are filled with liquid halide compounds so that the oxygen carrier gas stream can there is doped or charged with molecules of such halide compounds before it enters into the tube T. The flow-volume regulators M may be controlled by a programmer P to provide the correct dosage in each case. Such volume or flow regulator apparatus may also be provided to control gaseous as well as, where appropriate, compressed components C. The appropriate relative flow rates corresponding to any desired coating layer composition can be easily determined by fully conventional considerations. The gaseous streams are combined forwardly of the tube T, which is mounted on a synchronous lathe made for use with glass (e.g., Arnold, Weilburg, supplied by Heathway Company, Huntington, England), flow through the tube and pass into the effective temperature zone of a suitable heat source H, i.e., a burner travelling along the longitudinal axis of the tube on its outer periphery. It is here that decomposition takes place, namely pyrolysis to form metallic oxide glass layers.

The excess oxygen leaves the tube at the opposite end. The heat source is slidingly displaced to and fro over the length of tube parallel with the tube axis to ensure an even layer coating along the inner wall surfaces of the tube. By stepped variation of the concentration of the metallic halides which are carried along in the stream of carrier gas, and with the aid of the flow-volume regulator M and the programmer P, it is possible to vary the composition of the resulting glass from layer to layer in the course of the coating process. When a sufficiently thick layered interior coating of varying concentration has been precipitated, the tube is collapsed by conventional methods to form a rod, or preform, which is subsequently drawn out into a fiber.

To avoid undesired condensation of high temperature vaporizing components, the entire tube-deposition system is normally enclosed in a conventional heating jacket.

In general, the ranges of appropriate values for the significant process parameters are as follows. The most important feature, of course, is the heretofore never used high temperature range of 1850°–2150° C., preferably 1950°–2050° C., and especially 2000°–2050° C. for the tube substrate. To successfully utilize this temperature range, the following burner parameters are suitable: velocity: 0.15–3 m/min, preferably 1.5–2.0 m/min or also 25–35 cm/min or 28–33 cm/min; burner temperature 2000°–2300° C., preferably 2100°–2150° C.; and burner width 1–8 cm, preferably 3–5 and 4–5 cm. Suitable silica tube characteristics include: rotation speed 50–200 rpm, preferably 70–100 rpm; width of heated zone 2–5 cm, preferably 3–5 or 3–4 cm; and length 1000–1500 cm.

Suitable outer diametere include 10–30 mm, preferably 14–20 mm; and wall thicknesses 0.8–2 mm, preferably 1.4–1.7 mm.

Both carrier gas ($O_2$) and decomposable metallic halides should be of the highest purity to ensure a high purity of the final product fiber and close control over the composition of the glass layers and correspondingly, the refractive index thereof, e.g., p.a. (pro analysis) grade reagents can be used. Generally, the flow rate of the carrier gas varies between 100–2000 ml/min., preferably 500–700 ml/min; and of the decomposable gases between 10–2000 ml/min., preferably 50–500 ml/min. Generally the overall gas pressure in the tube is 800–1000 mmHg and the overall flow rate is 100–2000 ml/min. Suitable carrier gas temperatures are 20°–30° C. and halide or other decomposable metallic compound temperatures 30°–70° C.

In general, 20–200 layers, preferably 70–100 layers are deposited in the light-conducting core. These layers are of 3–10 μm, preferably 4–7 μm in thickness and generally all have about the same thickness. Preferably, the composition of each layer differs from that of the preceding layer so that the index of refraction increases from the first layer to the next, i.e., inwardly towards the center of the tube. The profile of the refractive index as a function of radial distance is usually a parabola but any desired profile is attainable.

After deposition of the layers is complete, the tube is conventionally collapsed and drawn. Collapsing is effected in stages by raising the tube temperature to greater than 2150° C., e.g., >2150°–2350° C. This is most easily accomplished by decreasing the burner velocity to values of 10–12 cm/min typically. Generally, 1–6 stages are used to fully collapse the tube, in each stage the burner velocity being decreased by approximately 3–10 cm/min., i.e., the tube temperature being increased by 100°–150° C. in each stage. In the first stage, a temperature of 2150°–2200° C. is used. During each stage, a stream of pure oxygen is passed through the tube. Initially the flow rate of the oxygen is 5–500 ml/min. This flow rate is decreased in each step. Just before the last stage, i.e., elimination of the last internal cavity (a capillary), the oxygen flow is eliminated. The $O_2$ flow rate decrease for each collapsing step is in more or less linear fashion from initial value to zero flow rate.

The collapsed fiber can be drawn by fully conventional techniques. Typical optical fiber diameters are 50–290μm, preferably 60–150μm.

Prior to the deposition of the layers, conventional pretreatments of the tube can be effected. For example, the tubes are initially flushed with 10% HF solution, p.a., and additionally purged with distilled water and distilled $CH_3OH$, and dried with dry $N_2$. Subsequently, they are pre-annealed by heating with an oxyhydrogen gas burner, the flame temperatures being 500°–1000° C. and the burner velocity being 2.5–3.0 m/min. Typical treatment times are for periods of 3–15 min., preferably 5–10 min. During this pre-annealing, a gas flow of 300–500 ml/min of $O_2$, 0–50 ml/min of $N_2$ and 0–50 ml/min of He or similar gases traverses the tube.

All gases throughout the process are generally passed through filters, e.g., Milipore filters having Teflon diaphrams, prior to entering the gas manifold and tube.

Actually, the idea of utilizing higher temperatures for the internal cladding step seems absurd at first and indicates the unobviousness of the present invention. This is so because the entire procedure of the internal cladding method depends very much on the permanent, pure geometry of the glass tube. This tube is traversed by the reactive gaseous mixture during deposition and is clamped into a rotary glass lathe at both ends. It rotates while a burner travels to and fro underneath, producing the pyrolysis in the tube. High temperatures, especially about 1800° C., result in softening of the tube, leading to its deformation unless the procedure of this invention is employed. Thus, heretofore, it was not considered feasible to employ such high temperatures due to adverse tube effects.

Another significant advantage of the process of this invention resides in that, at the particularly high pyrolysis temperature employed, differences in the degree of pyrolysis during the decomposition of the metal halides in the presence of oxygen are diminished. For this reason, problems occurring due to fractional pyrolysis at lower temperatures (less than 1800° C.) are mitigated. The novel high-temperature process operates, therefore, at above 1850° C.

The complete deposition of the gaseous mixture in the process of this invention represents a special advantage. By use of the elevated temperature, the conventional clogging of the waste gas pipe is eliminated. Such clogging represents a permanent danger during the internal soot coating method and leads to bulging of the hot pipe, bursting therof, and thus to failure of the entire manufacturing process of the preform.

Figure 10:
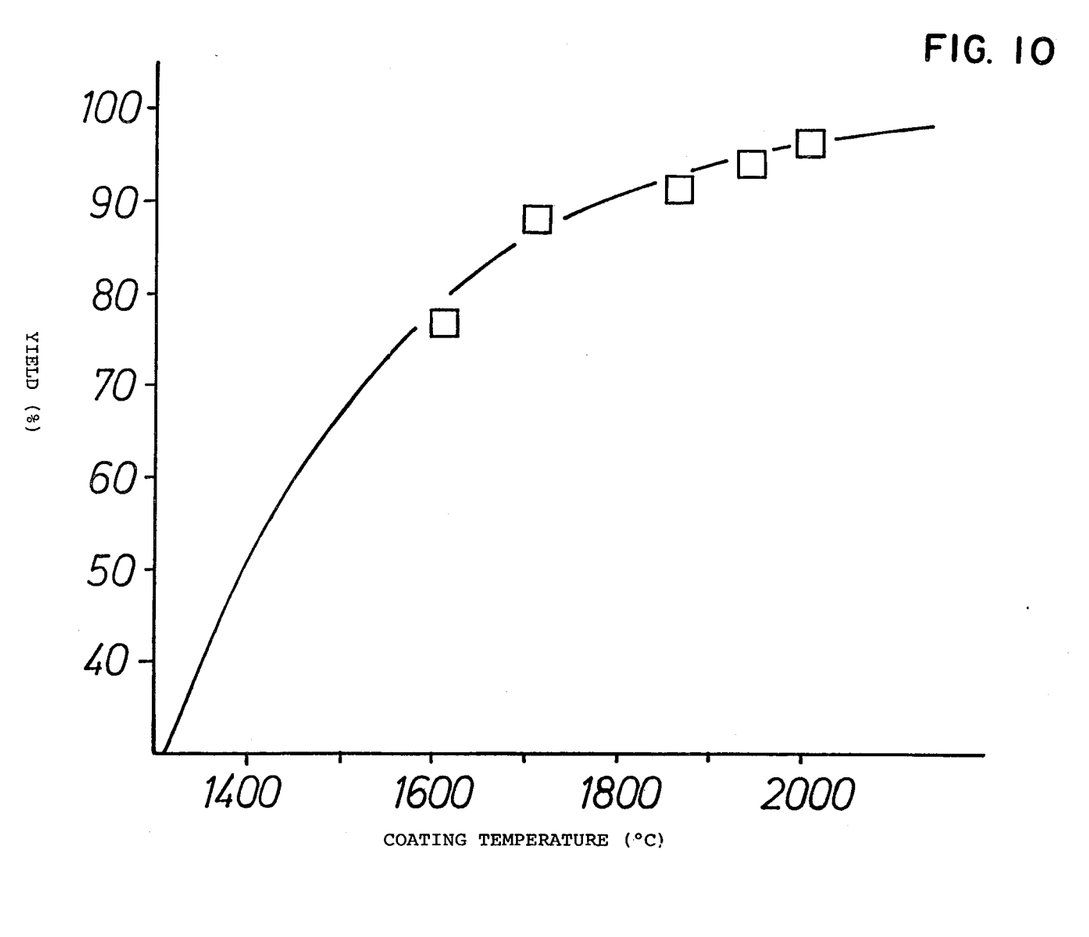
FIG. 10 illustrates the relationship between the pyrolysis yield and the cladding temperature.

In addition, as set forth in Table 1 below, there is a great increase in yield when using the high-temperature method if the temperature of 1850° C. is exceeded. Only above this temperatures does it appear possible to attain a yield higher than 90%. FIG. 10 is a graphic illustration of this fact. Therein the pyrolysis temperature is plotted on the abscissa and the degree of effectiveness of the deposition (yield) is plotted on the ordinate.

TABLE 1

PYROLYSIS YIELD AS A FUNCTION OF PYROLYSIS TEMPERATURE

| Pyrolysis Temperature | Yield in Pyrolysis of the Gaseous Mixture |
|---|---|
| 1620° C. | 76% |
| 1735° C. | 88.5% |
| 1825° C. | 89.4% |
| 1910° C. | 92% |
| 1985° C. | 94.7% |

The determination of tube temperature can be problematic since it can be greatly influenced by errors of the measuring instrument. Although good results are obtained with a pyrometer operating at a wavelength of 5μm, (e.g., Williamson Pyrometer 2000, E-factor to 0.9), it is advantageous and recommended to employ additionally a generally verifiable, physical property as a reference diagnostic measurement. Such a property can advantageously be the softening temperature of silicate glass [flint glass], which is around 1670° C. With the aid of this combined measuring arrangement, the collapsing of a silicate glass tube, with an outer diameter of 20.0 mm, and a wall thickness of 1.4 mm, can be observed, for example, at 2058° C. in four steps, wherein the outer diameter of the tube is reduced by partial collapsing during the internal cladding to 18.4 mm.

The diameter of the preform after collapsing was 11.4 mm in this case. Thus, by means of this measuring arrangement, defined by the viscosity (softening temperature) of the known silicate glass, it is readily possible to check the temperature values indicated in this application. The softening temperatures can be measured by any conventional method such as those employed in the Examples.

The temperature of the tube is controlled by means of pyrometers. These pyrometers give their signals to electronically controlled flow meters for the burning gases, Eg.$H_2$ and $O_2$.

That means: faster burner velocity is not influencing temperature of deosition, because more energy is used by the burner with higher velocities.

Only the thickness of layers deposited is influenced by the burner velocity, resulting in different core thickness. But these values are not essential for the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

TABLE 2

EXAMPLES 1–8
Characterization of Precollapsing and of Collapsing to the Preform

| EXAMPLE | 1 | 2 | 3 | 4 | 5 | 6 | 7 | 8 | Comp. Ex. 1 | Comp. Ex. 2 |
|---|---|---|---|---|---|---|---|---|---|---|
| Number a of core layers without optical insulation | 60 | 50 | 90 | 70 | 65 | 65 | 50 | 70 | 65 | 65 |
| Temperature of the cladding process in °C. | 1950 | 2050 | 1900 | 1910 | 1855 | 1975 | 1870 | 1885 | 1890 | 1890 |
| Temperature of the collapsing steps in °C. | 2050–2150 | 2300 | 2050–2250 | 2200 | 2210 | 2270 | 2250 | 2250 | 2170 | 2170 |
| Number of collapsing steps | 4 | 1 | 2 | 3 | 3 | 1 | 2 | 2 | 4 Preform oval | 4 Preform oval |
| Outer tube diameter | 20.00 | 20.00 | 20.00 | 20.00 | 20.00 | 14.00 | 18.00 | 18.00 | 14.00 | 18.00 |

TABLE 2-continued
EXAMPLES 1-8
Characterization of Precollapsing and of Collapsing to the Preform

| EXAMPLE | 1 | 2 | 3 | 4 | 5 | 6 | 7 | 8 | Comp. Ex. 1 | Comp. Ex. 2 |
|---|---|---|---|---|---|---|---|---|---|---|
| $2 \times R_o$ before cladding in mm. Inner tube diameter | 17.20 | 17.20 | 17.20 | 17.20 | 17.20 | 11.60 | 14.80 | 14.80 | 11.60 | 15.20 |
| $2 \times R_i$ before cladding in mm. | | | | | | | | | | |
| Inner diameter $2 \times r_x$ before first collapsing step in nm. | 7.50 | 7.10 | 7.70 | 7.90 | 8.30 | 2.59 | 3.76 | 3.45 | 10.58 | 9.28 |
| Cladding thickness d of the layers (20 + a) on the inner wall prior to collapsing in mm. | 998 | 434 | 546 | 921 | 417 | 615 | 325 | 505 | 573 | 418 |
| $R_o/R_i$ | 1.16 | 1.16 | 1.16 | 1.16 | 1.16 | 1.21 | 1.22 | 1.22 | 1.21 | 1.18 |
| $R_i/r_i$ | 1.81 | 2.16 | 1.96 | 1.77 | 1.88 | 1.81 | 1.81 | 1.87 | 1.23 | 1.80 |

Figure 8:
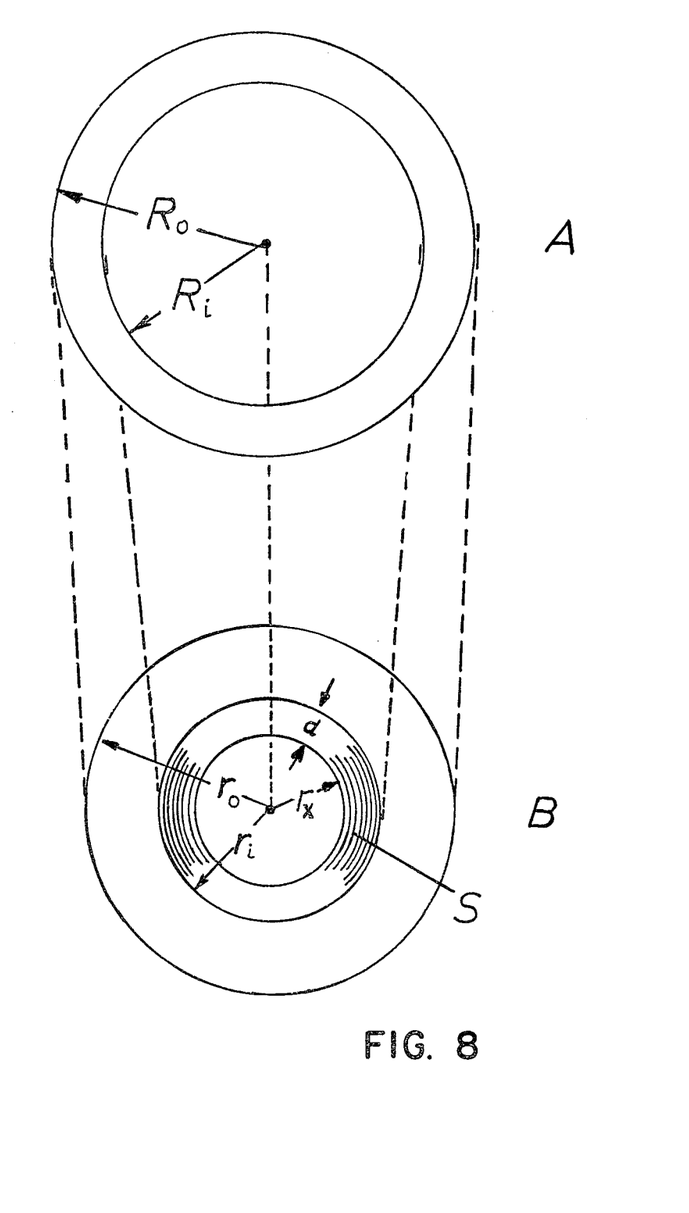
FIG. 8 illustrates the relationships between the tube dimensions before and after cladding.

For definitions of $R_o$, $R_i$, $r_i$, and d, see FIG. 8. Comparative Examples 1 and 2 show the limits of the invention; they lie outside of the scope of the invention.

EXAMPLE 9

Tube

Heralux WG
Outer diameter: 20 mm
Wall thickness: 1.4 mm
Length: 1000 mm

Cladding: Optical Insulating Layer

Gas composition:
100 ml $O_2$/min through $BBr_3$; temp. of thermostatic fluid 70° C.
150 ml $O_2$/min through $SiCl_4$; temp. of thermostatic fluid 30° C.
100 ml $O_2$/min through $SbCl_5$; temp. of thermostatic fluid 70° C.
1000 ml $O_2$/min of pyrolysis oxygen
Number of layers: 20
Cladding temperature:
  1st layer: 2050° C.;
  2nd and third layers: 1900° C.,
  starting with 4th layer: 1850° C.

Intermediate Layers

Two layers only pyrolysis oxygen, temperature 2050° C.

Cladding: Core

Gas composition:
280 ml $O_2$/min through $SiCl_4$; temp. of thermostatic fluid 30° C.
450-0 ml $O_2$/min through $BBr_3$; temp. of thermostatic fluid 70° C.
5-420 ml $O_2$/min through $GeCl_4$; temp. of thermostatic fluid 30° C.
100 ml $O_2$/min through $SbCl_5$; temp. of thermostatic fluid 70° C.
15 ml $O_2$/min through $POCl_3$; temp. of thermostatic fluid 30° C.
1000 ml $O_2$/min of pyrolysis oxygen
Number of layers: 55
Cladding temperature: 1975° C. constant

Collapsing

Four steps at 2045°-2060° C. without gas ballast;
one step at 1700°-1800° C. to avoid crystobalite

Properties of the Preform

Length 580 mm, 450 mm thereof is usable for fibers
Outer diameter: 11.4 mm
Core diameter: 6.7 mm

Properties of the Fiber

Outer diameter:
105μm; db/km<4/860 nm; pulse dispersion <2 ns/km
Core diameter: 53μm; db/kn <3/1060 nm; tear strength:
  16 N (max.)
  9 N (min.)
Numerical aperture: 0.23
Length about 3.3 km.

EXAMPLE 10

A Heralux WG quartz tube made by Heraeus Quarzschmelze, Hanan, and having the following dimensions: length, 2000 mm; outer diameter, 14 mm; and wall thickenss 1.4 mm, is cleansed with a 5% hydrofluoric acid solution in an ultrasonic bath, rinsed with distilled water and distilled ethanol, and dried in a dry $N_2$ stream. This tube is clamped into a synchronized lathe (Heathway S 4/3"), connected via a "Teflon" hose to the gas-generating apparatus, and rotated at 85 r.p.m. By means of an oxyhydrogen gas burner with 5 semicircularly arranged burner heads, the tube is annealed to 2100° C. During this step, the annealing zone has a width of about 3 cm; the advance of the burner is 35 cm/min, the spacing of the tube surface from the 7-apertured, externally mixing burner heads is 7 cm. The temperature is measured with an infrared thermometer made by Williamson (type 4420-s-ap) with a special measuring range of 1300°-2300° C. The spacing of the thermometer from the glowing tube is 30 cm, the measuring spot is 2.5 cm. The zero point is automatically corrected. The device was previously compared with a calibrated infrared thermometer, type Ircon 710: the deviation was ±10° C.

While the tube is preannealed in this way, 600 ml of dried and repurified $O_2$ flows through the tube. Thereafter, 25 optical insulating layers of $Sb_2O_5/B_2O_3/SiO_2$ material are applied at a tube temperature of 1900° C. within the tube by pyrolysis in a glassy state. For this purpose, 200 ml of $O_2$ is conducted through $SiCl_4$, maintained at a temperature of 30° C., and this aerosol is mixed together with 50 cc of $BCl_3$ gas and the 600 ml of excess $O_2$ in the mixing chamber, and then conducted into the tube via the "Teflon" hose.

At these temperatures, glassy layers, rather than soot, are obtained. The very thick layers are completely refined during these temperatures; no bubbles remain, and there is no formation of secondary bubbles, either, during the subsequent core cladding and collapsing procedure.

After the enveloping layers have been applied, the core layers are built up. For this purpose, the aerosol is enhanced with 20 ml/min $O_2$ charged with $POCl_3$, 5 ml/min $O_2$ charged with $SbCl_5$, and 5 ml/min $O_2$ charged with $GeCl_4$. Within 50 layers, the flow rate of the $BCl_3$ stream is lowered linearly to 0, and that of $GeCl_4$ is raised to 250 ml/min and that of $SbCl_5$ to 50 ml/min, both linearly.

The components are separated by pyrolysis from the gas at a tube temperature of 2000° C. in the form of oxides and are molten to the glassy state. The reaction to the oxides takes place almost completely.

After the buildup of the core, the gas feed is interrupted, and the annealing temperature is increased to 2200° C. by reducing the burner advance appropriately. Since, due to the high cladding temperature, the tube is already greatly collapsed, this collapse is continued so that the tube becomes the preform without any substantial vaporization of the inner layers; the preform has the following dimensions: outer diameter 8.5 mm; core thickness, 4.2 mm; and thickness of outer shell, 0.7 mm. The preform can subsequently be drawn according to known methods to obtain a radiation-stable communication fiber. The transmission losses of the fiber are 3.6 db/km at 860 nm and 1.6 ns/km pulse dispersion at 904 nm.

EXAMPLE 11

A quartz tube of the Amersil 08 type having the following dimensions: length, 1500 mm; outer diameter, 16 mm; and inner diameter, 13 mm is dipped for 3 minutes into hydrofluoric acid, rinsed with twice-distilled water, and dried by means of an infrared radiator. The tube is clamped into a synchronized lathe of the type Arnold Junior 2 Spezial Mec, connected to the gas-generating unit, and rotated at 100 r.p.m. An oxyhydrogen gas burner preanneals the tube at an advance of 24 cm/min to 2080° C. The oxyhydrogen gas burner is of a hemispherical configuration and is provided along a width of 5 cm with 75 nozzles in five rows. The burner is a water-cooled external mixer and provides a heating zone of 7 cm. The temperature is measured by way of a glass fiber pyrometer ST 2001, having a maximum spectral sensitivity of 0.8 $\mu$m, a measuring range of 1700–3000° C., and requiring at a distance of 10 cm a measuring surface of, on the average, 3 mm. The measuring accuracy as compared to the calibrated Ircon 710 amounts to ±15° C.

During the preannealing step, additionally purified oxygen, which has been dried over a molecular sieve and purified by passage through membrane filters flow at 1000 ml/min through the tube. The optical insulating layers are deposited in the glassy state at 2000° C. by pyrolysis of an $O_2$ stream charged with $SiCl_4$ and $SbCl_5$, flowing at 250 ml/min as in Example 10. The 20 layers of pure $SiO_2+Sb_2O_5$ are applied homogeneously and without bubbles.

Thereafter, two intermediate layers are applied without $SiCl_4$-containing $O_2$ at 2100° C. to ensure a complete refining of the layers. Then there are added to the excess $O_2$ 150 ml/min $O_2$ charged with $SbCl_5$; 10 ml/min $O_2$ charged with $GeCl_4$; 300 ml/min $O_2$ charged with $SiCl_4$, and 5 ml/min $O_2$ charged with $POCl_3$, and deposited in the glassy state at 2050° C. $GeCl_4$ and $POCl_3$ are maintained at 40° C. by thermostat, $SbCl_5$ is maintained at 80° C. in the same way. Within 70 core layers, the amount of $O_2$ flowing through $GeCl_4$ is linearly raised to 300 ml/min and that flowing through $POCl_3$ is linearly increased to 50 ml/min. After termination of the core buildup, the stream of components is interrupted and, under a residual $O_2$ pressure of 0.76 mmHg, the already strongly collapsed tube is finally collapsed to the preform by reducing the burner advance and by the ensuing increase in temperature to 2300° C. The rod has a useful length of 800 mm, an outer diameter of 9.8 mm, and a core diameter, including the insulating layers, of 6.0 mm.

EXAMPLE 12

A quartz tube of the type Heralux WG having an outer diameter of 20 mm., a wall thickness of 1.5 mm., and a length of 1000 mm. is cleansed, dried, and clamped into the synchronized lathe. By way of a "Teflon" coupling, the tube is connected to the gas-generating apparatus and, while it is being rotated at 100 r.p.m., flushed with additionally purified oxygen passed via a molecular sieve and membrane filter. A multiple-head burner having an advance of 30 cm./min. preanneals the tube at 2100° C. The heating zone is of a width of about 2 cm., the temperature measurement is executed via an infrared thermometer; the latter transmits the thus-measured voltage to a measuring and control device comparing the measured voltage with the desired voltage and correspondingly regulating the hydrogen of the oxyhydrogen burner.

The oxygen stream is now adjusted to 1000 ml./min. and, by means of control valves made by Brooks and Tylan, 75 ml./min. of $O_2$ is passed through $SiCl_4$ maintained at 30° C. by a thermostat, 50 ml./min. of $O_2$ is passed through $BBr_3$, and 40 ml./min. of $O_2$ is passed through $SbCl_5$ (Optipur by Heraeus), both maintained at 70° C. by means of a thermostat. The thus-charged $O_2$ stream is mixed in a mixing tower with the pyrolysis $O_2$ and introduced into the tube. In the latter, a glassy layer is deposited by pyrolysis at 2050° C. from the aerosol on the quartz surface. The layer is absolutely free of bubbles and soot.

In the two subsequent layers, the temperature is lowered to 1950° C. and then the residual 17 layers are applied by hydrolysis at 1900° C. Thereafter, the stream of components is interrupted, and in two layers, with pure $O_2$, the thus-produced outer shell layers are once again refined at 2100° C.

After the production of the insulating layers, the core layers are built up. For this purpose, the excess $O_2$ is combined with 50 ml/min $O_2$ charged with $BBr_3$; 200 ml/min $O_2$ charged with $SiCl_4$; 5 ml/min $O_2$ charged with $GeCl_4$; 40 ml/min $O_2$ charged with $SbCl_5$; and 9 ml/min $O_2$ charged with $POCl_3$. Within 80 layers the $GeCl_4$ concentration is raised to 250 ml/min, and that of $BBr_3$ is changed linearly to O, while the other components are maintained constant.

From the gaseous stream, the oxides are deposited at 2000° C. and molten to the glassy state. During the cladding process, the tube is reduced in diameter to about 10 mm. The gaseous stream is interrupted after the last layer, and by increasing the temperature, which is done by reducing the advance, the tube is collapsed in 5 steps to the circular, radiation-stable preform. The drawn fiber has, with an outer diameter of 134 μm, a core diameter of 60 μm. From this preform 3 km of fiber could be drawn. The deviation of the fiber from the circular form was below 2%. An α of 1.94 was measured at the flawless profile of the fiber. The pulse dispersion was 1.64 ns/km at 850 nm, the transmission losses were 4.2 db/km at 860 nm.

EXAMPLE 13

A quartz tube Heralux WG (Heraeus Quarzschmelze, Hanau) having a length of 1,000 mm, an outer diameter of 14 nm, and a wall thickness of 1.2 mm, is clamped onto a synchronized lathe and connected to a gas manifold system. While 500 ml/min of (room temperature) $O_2$, purified and additionally dried by passing through a molecular sieve (quality 4.5), flows through the tube, the latter being rotated at 100 rpm, the quartz tube is annealed with an oxyhydrogen gas burner at 2,050° C. The flame of this burner sweeps the tube at 2 m/min.

Other system parameters were:
(a) burner temperature —2100° C.
(b) width of burner —40 mm
(c) width of heated zone on tube —30 mm
(d) $O_2$ temperature —20° C.

Subsequently, 30 layers of a low-refractive index glass, consisting of 30% by weight of $B_2O_3$, 1% by weight of $Sb_2O_3$, and 69% by weight of $SiO_2$, are deposited at 1,850°–2,050° C. on the inner tube wall by the pyrolytic decomposition of $BCl_3$, $SbCl_5$, and $SiCl_4/O_2$ aerosols (average layer thickness: 5 μm; flow rates: $BCl_3$ –20 ml/min; $SbCl_5/O_2$ –50 ml/min; $SiCl_4/O_2$ –150 ml/min). Then, the $BCl_3$ stream is interrupted and the buildup of the light-conducting core material is begun at a somewhat higher temperature of 2,070° C. by decreasing the burner velocity to 150 cm/min. By way of the gas-generating vessels, attached to the gas manifold, kept at a temperature of 50° C., 107 ml/min of $O_2$ flow through $SiCl_4$ (Wacker Chemietronic Quality RSQ), 50 ml/min of $O_2$ flow through $POCl_3$ (MERCK Quality Optipur), 12 ml/min of $O_2$ flow through $GeCl_4$ (MERCK Quality Optipur), and 2.5 ml/min of $O_2$ flow through $SbCl_5$ (Riedel-de Haen). The aerosols are pyrolytically decomposed in the tube at 2,070° C. and the layer is molten to the vitreous state on the inner wall of the tube. During the buildup of the 70 core layers, (average thickness: 5.7 μm) the amount of $O_2$ flowing through the $GeCl_4$ and $SbCl_5$ vessels is linearly increased to 98 ml/min of $O_2$ in the case of $GeCl_4$ and to 51 ml/min of $O_2$ in the case of $SbCl_5$. Thereby, the refractive index rises during the core buildup from 1.527 in the first glassy layer to 1.587 in the last, whereas the concentration of $Sb_2O_3$ in the glass rises from 0.02% to 1.5% by weight of the total weight of each layer.

The increase in the $Sb_2O_3$ content in successive layers is effected in order to achieve the desired refractive index profile —not as a requirement to achieve the stabilization effects of this invention. As mentioned previously, for stabilization purposes, the $Sb_2O_3$ would be evenly distributed throughout the various layers —as it is in the borosilicate layers, and would be in the core layers had $Sb_2O_3$ not been used as the "third component"-type of DAS 2,546,162 in this Example. That is, this fiber has a multicomponent core based on a $SiO_2/P_2O_5$–$GeO_2/Sb_2O_3$ system. Cores not containing amounts of $Sb_2O_3$ sufficient to achieve the stabilization of this invention, of course, must have effective amounts of $Sb_2O_3$ added.

After the core buildup, the tube is collapsed stepwise to obtain a rod by increasing the temperature to 2,300° C. This rod has an outer diameter of 8 mm, a core diameter of 4.3 mm, and a useful length of 530 mm. The rod is subsequently drawn to obtain a fiber of diameter 135 μm.

EXAMPLE 14

A quartz tube (Amersil) having a length of 1.250 mm, an outer diameter of 20 mm, and a wall thickness of 2.0 mm, is flushed with a 10% hydrofluoric acid solution, p.a., (pro analysis), additionally purged with distilled $H_2O$ and distilled $CH_3OH$, and dried with dry $N_2$. This tube is clamped into a synchronized lathe, connected to the gas handling apparatus, and rotated at 57 rpm. By means of an oxygen/propane burner with a velocity of 1.3 m/min, the tube is preannealed to 2,100° C. During this step, the tube is traversed by 400 ml/min of $O_2$ (quality 4.5), 100 ml/min of $N_2$ (quality 5.0), and 50 ml/min of He (quality 6.0). The gases are first passed through a "Milipore" filter having a "Teflon" diaphragm. Thereafter, 10 layers of $SiO_2$ and $Sb_2O_3$ are baked on at 2,100° C.

Other system parameters were:
(a) burner temperatures —2150° C.
(b) width of burner —50 mm
(c) width of heated zone on tube —40 mm
(d) $O_2$ temperture —30° C.

For this purpose, 100 ml/min of $O_2$ is passed through $SiCl_4$ (FLUKA) kept at a temperature of 30° C. and the same amount through $SbCl_5$ (MERCK) kept at a temperature of 80° C. and the aerosol is pyrolytically decomposed in the tube. Thereafter, 75 ml/min of $POCl_3$ aerosol is added thereto in metered amounts. Furthermore, starting with this point in time, 50 ml/min of $O_2$ is passed through $SbCl_5$, kept at a temperature of 93° C., and added in metered amounts and the burner speed is increased to 1.5 m/min. From the charged gaseous stream, the oxides are deposited at 2,010° C. and molten to a glassy state on the inner wall of the tube. During the further buildup of the core gradient, the amount of $O_2$ flowing through the $SbCl_5$ is increased parabolically , over 53 layers to 390 ml/min $O_2$. During this step, the content of $SbCl_5$ rises from 0.2% to 2.9% by weight based on the total weight of each layer. The refractive index correspondingly rises from 1.518 to 1.531. The multicomponent glass system of this example is thus $SiO_2/P_2O_5/Sb_2O_3$. After the core buildup is completed, the diameter of the tube and the thickness of the layers are reduced by a factor of about one-half during each collapsing step in which the tube is heated up to 2,250° C. by reducing the ratio of the burner advance to 1.1 m/min. The tube, collapsed into a preform, has an outer diameter of 10 mm and a core diameter of 3.2 mm. The useful length is 690 mm. The preform is subsequently drawn into a fiber of 140 μm in diameter.

In accordance with these examples, light-conducting fibers for the transmission of communication can be produced which withstand more than $10^3$ rad of short-term exposure without strongly lessening their transmission in the infra-red range of the spectrum.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of communication fibers having transmission losses of less than 10 db/km and a pulse dispersion of less than 4 ns/km, both measured at 860 nm by the internal cladding method, wherein multiple-component glasses are deposited in layers in the glassy state in the interior of a glass tube; the tube thus clad inside, is collapsed to a rod; and the rod is drawn into a fiber, the core diameter of which has an eccentricity of lesss than 2%, the improvement wherein a precollapsing step is executed prior to the final collapsing process, the precollapsing step occurring during the internal cladding step, wherein the glass tube is precollapsed during the internal cladding step to such an extent that the ratio $R_i/r_i$ is larger than 1.7, wherein $R_i$ is the inner tube radius prior to the cladding step and $r_i$ is the inner tube radius after completion of the cladding step and prior to the final collapsing step.

2. A process of claim 1, wherein the internal temperature of the tube during the entire internal cladding process is maintained at above 1850° C.

3. In a process for the production of communication fibers having transmission losses of less than 10 db/km and a pulse dispersion of less than 4 ns/km, both measured at 860 nm by the internal cladding method, wherein multiple-component glasses are deposited in layers in the glassy state in the interior of a glass tube; the tube thus clad inside, is collapsed to a rod; and the rod is drawn into a fiber, the core diameter of which has an eccentricity of less than 2%, the improvement wherein a precollapsing step is executed prior to the final collapsing process, the precollapsing step occurring during the internal cladding step, wherein the glass tube is made of silicate glass and the internal cladding is conducted at a temperature lying above the softening temperature of silicate glass.

4. A process of claim 1, wherein the glass tube has a wall thickness such that $R_o/R_i$ is larger than 1.15, wherein $R_o$ is the outer tube radius and $R_i$ is the inner tube radius, both prior to the cladding step.

5. A process of claim 1, wherin the glass tube is made of silicate glass.

6. A process of claim 5, wherin the internal cladding is conducted at a temperature lying above the softening temperature of silicate glass.

7. In a process which comprises coating at least one layer of glass onto the inner surface of a heated silicate glass tube by chemical vapor deposition, the improvement wherein the temperature of the tube is about 1850°–2150° C. during the deposition of the glass layers.

8. The process of claim 7, wherein the composition of the sequential layers varies stepwise so that the refractive index profile of the layer is parabolic increasing inwardly towards the center of the tube.

9. The process of claim 8, which further comprises depositing at least one light-insulating layer of borosilicate glass on the tube prior to deposition of the light-conducting layers.

10. The process of claim 9, which further comprises collapsing the tube and then drawing it out to produce an optical fiber.

11. The process of claim 10, wherein the tube temperature during the cladding step is 1950°–2050° C.

12. The optical fiber produced by the process of claim 1.

13. The optical fiber produced by the process of claim 10.

14. In a process for making optical fibers which comprises rotating a silicate glass tube clamped to a synchronous lathe at 50–200 r.p.m.; heating the tube by means of an exterior burner of width 1—8 cm, travelling along the longitudinal axis of the tube at 0.15—3 m/min; passing a gas of $O_2$ through the tube at 100–2000 ml/min, said gas consisting essentially of carrier gas $O_2$ and entrained gases; and sequentially entraining in the carrier gas a mixture of predetermined composition of vaporized metallic compounds which when in the heated tube will be decomposed to a mixture of the corresponding metallic oxides which oxides will deposit on the inner surface of the tube to form a glass layer having a predetermined refractive index;

the improvement wherein the temperature of the heated tube is 1850°–2150° C. during the deposition of the glass layers.

15. The process of claim 2, wherein the temperature of the tube during the entire internal cladding process is maintained at a value which is at most 160° C. lower than the collapsing temperature.

* * * * *